Patented July 5, 1938

2,122,761

UNITED STATES PATENT OFFICE 2,122,761

METHOD OF MAKING BEER OR THE LIKE

John F. Silhavy, Saginaw, Mich.

No Drawing. Application November 30, 1935,
Serial No. 52,404

26 Claims. (Cl. 99—52)

This invention relates to improvements in methods of making beer or the like.

My invention is concerned with the manufacture of beer or the like and in particular with methods of dialyzing one solution against another solution to cause migration of desirable constituents from one solution to the other whereby new and different products may be obtained.

In present day brewing practise one of the most important steps, whereby the brewmaster attempts to control the character and quality of his finished product, is the one called mashing. It is in this step that soluble ingredients are dissolved out from the grains and here the composition of the wort is definitely established. These soluble ingredients comprise fermentable sugars and non-fermentable extract or material. The correct balance of these fermentable and non-fermentable constituents is a most important factor in determining the character of the finished product. The fermentable constituents include the sugars, maltose, glucose, etc. which are derived from the starch during mashing. The non-fermentable constituents include dextrins (also derived from the starch and more or less soluble and colloidal in nature) and a large class of soluble bodies which have been derived by breaking down the natural proteins and other nitrogenous compounds such as albumoses, peptones, etc. by enzyme activity during mashing.

The fermentable sugars, of course, determine the alcoholic content of the finished product while the non-fermentable extract produces foam stability and the character known as "Vollmundigkeit" or full bodiness. If the wort is high in fermentable substances and low in non-fermentables, a thin and low flavored product is obtained. If the non-fermentable substances are high in the wort, a product is obtained which will have a lower alcoholic content and which will cloud on cooling. These different ratios of fermentables to non-fermentables result to a limited extent by employing selective mashing temperatures. From the foregoing it will be apparent that the ratio of fermentables to non-fermentables is important and greatly influences the quality and character of the finished product to a very marked degree. It is this ratio which the brewmaster wishes to control with as much exactitude as possible in order to produce the results desired. However, in present day practise the control of this ratio by selective mashing temperatures is by no means as flexible and positive as is to be desired.

According to my invention I can control this ratio with a far greater degree of accuracy than is possible at present and without the necessity of discarding present apparatus. In addition to this most important advantage of accuracy of control, there are many others which will become apparent from the following description of various forms of my invention which are the best that are known to me at this time. But my invention is not to be restricted to the forms or examples given, as my inventive concept may take other similar or slightly varied forms to produce results not heretofore obtainable. In practising my invention I can increase the malt flavor of beer without increasing the amount of objectionable albumins. Also I am able to protect the proteins and dextrins in wort from the excessive or drastic action of certain yeast constituents while still permitting complete fermentation. My invenion may be applied to the manufacture of other fermented beverages where it is desired to control the various characteristics of the beverage.

In carrying out my invention, I employ the well-known principle of dialysis. In dialysis a membrane or parchment is used as a means of separating diffusible materials (crystalloid group) from non-diffusible or difficultly diffusible materials (colloid group). Both diffusible and non-diffusible or difficultly diffusible substances are present in wort and unhopped malt wort. To the diffusible substances belong the sugars as well as some of the simpler nitrogenous bodies which serve as yeast food. To the non-diffusible or difficultly diffusible substances belong the dextrins and the large class of complex nitrogenous bodies. When yeast is added to ferment wort, this addition involves further diffusible and non-diffusible or difficultly diffusible substances because yeast is a mixture and contains some diffusible and some non-diffusible or difficultly diffusible constituents.

I will first generally describe, as a simple example, the dialysis of a wort against pure water and then describe the effect of adding yeast. The example given is a general one intended mainly to show the important migrations of the various constituents in the solutions. A dialyzing membrane or parchment is used to separate a container into two compartments. When I use the word "wort" I mean a malted, hopped liquid which when fermented with yeast produces beer. When I describe the unhopped malted liquid which leaves the mash tub and before hops are added, I will use the term "unhopped malt wort". The wort is put into one compartment on one side of the membrane and the pure water is put into the other compartment on the other side of the membrane. The wort selected is an average wort of about 12° Balling. After a period of time and after a dialyzing action has been permitted there will be a separation of the large from the small molecules and in this way the ratio of fermentable constituents to non-fermentable extract or material may be controlled. After the dialyzing action has gone on for a period of time, a definite amount of glucose, maltose, sucrose, and small-sized or small molecule nitrogenous substances has passed through the membrane from the wort to the water, while a small amount of water has passed through the membrane into the wort.

After a certain dialyzing time (depending on the results desired), yeast is added to the diffusate and fermentation soon sets in. The enzymes in yeast will attack and break down the sugar and form alcohol. Maltase will break down maltose into two molecules of glucose, invertase will break down sucrose into glucose and fructose, and alcoholase will break down these monoses into alcohol and carbon dioxide. As the concentrations of these sugars decrease on this side of the membrane due to the action of the enzymes, there will be an increased tendency for more of the sugars to migrate through the membrane from the wort to the water side due to the natural tendency to maintain equilibrium.

There will also be a migration in the other direction from the water and yeast side through the membrane to the wort side. A small amount of invertase and maltase from the yeast will migrate into the wort and will attack only sucrose and maltose thereby increasing the concentration of glucose and fructose in the wort which further helps the dialyzing action. In addition a certain amount of small-sized (small molecule) nitrogenous substances will diffuse from the wort into the water side and will function as yeast food. It is known that the nitrogenous substances diffuse through the yeast cell which is a membrane and the fact that these nitrogenous substances do function as yeast food by diffusing into the yeast cell proves that they will diffuse through the dialyzing membrane.

Some specific applications of my invention will now be given but it is to be expressly understood that I am not to be limited thereto. First I will give a relatively simple method of dialyzing fermented wort against freshly brewed wort. The average and usual wort is about a 12° Balling wort prior to pitching with yeast. About seven days after the addition of the yeast, the fermented wort will have dropped to about 4° Balling and this fermented wort is dialyzed against a freshly brewed wort. A dialyzing membrane or parchment separates the two liquids and the dialysis is permitted to proceed. As above set forth there will be migrations in both directions. After about four days' dialyzing action at a temperature of about 35° F., the 12° Balling wort will have dropped to about 10° Balling while the 4° Balling fermented wort will have been raised to about 6° Balling. These figures—10° and 6°—will not appear as such because fermentation has been proceeding during the dialyzing action to reduce the Balling readings. Some of the dialyzed fermentables from the unfermented wort are attacked by the yeast in the fermented wort, while the fresh wort is attacked by that portion of the yeast which migrates into it through the membrane from the fermented wort. After about four days' dialyzing action, each of the solutions separately is fermented in the customary manner. The length of time required for dialyzing may be varied as desired, and the temperature may be varied and is not to be restricted to the low temperature given in the specific example. In this way two different types of beer may be produced from the same type of wort.

A more complicated method utilizing the principles above set forth will be now given so as to cover the brews of a brewmaster from week to week. At the beginning of the method it is necessary to have fermented beer before any dialyzing is done. Some of the material given in the above simple example will be repeated in order to give a complete method for use in a brewery. Average and usual worts of about 12° Balling are made prior to pitching with yeast. About seven days after the addition of yeast, each fermented wort will have dropped to about 4° Balling. The fermented worts are dialyzed against freshly brewed worts. To use my invention in the brewery the brewmaster will roughly divide his wort made in the usual way into two portions. One portion will be dialyzed against the fermented portion. At the beginning brews will be made on alternate days as on the 1st, 3rd, 5th and 7th days while the brews on the 2nd, 4th and 6th days are omitted. The brews which are made are fermented according to usual procedure. A brew made on the 8th day will then be dialyzed against fermented #1 brew. A brew on the 9th day will be allowed to ferment, the 10th day brew will be dialyzed against fermented brew #3, brew #11 will be fermented, brew #12 will be dialyzed against fermented brew #5, brew #13 will be fermented, brew #14 will be dialyzed against fermented brew #7, brew #15 will be fermented, brew #16 will be dialyzed against fermented brew #9, etc. For the sake of simplicity, the scheme shown above assumes that one brew is made each day (#2, #4, #6 exceptions at the beginning), and hence the brew number corresponds with the day number and there will always be seven days difference between the age of the fresh wort and the fermented wort. However, I do not wish to restrict myself to this particular difference of seven days as the fermenting time may vary. A scheme similar to the above can be worked out in practice, taking into account Sundays when no brews are made and other days when two brews are made. During dialysis the migrations of the various substances are the same as given in the preceding example where wort was dialyzed against fermented beer.

After about 4 days' dialyzing action at about 35° F., the 12° wort will have dropped to about 10° Balling while the 4° fermented wort will have been raised to about 6° Balling. Neither of these figures (10 or 6) will appear as such because fermentation has been proceeding during the dialyzing action to reduce the Balling readings. Some of the dialyzed fermentables from the unfermented wort are attacked by the yeast in the fermented wort, while the fresh wort is attacked by that portion of the yeast which migrates into it through the membrane from the fermented wort. After about four days' dialyzing action, each of the solutions separately is fermented in the customary manner. The length of time required for dialyzing may be varied as desired, and the temperature may be varied and is not to be restricted to the relatively low temperature given in the above example.

Following the above method results in producing two different types of beer starting with the same type of wort. The method provides a treatment for controlling the flavor and appearance of the finished beer. The fresh wort, which was put in the dialyzer before fermentation, lost some of its fermentables. In the beer fermented from this wort the ratio of non-fermentable extracts to fermentable has been increased, which means that the finished beer will still possess full bodiness, good foam, and will be classed as a full bodied beer. The beer which had been fermented before entering the dialyzer will be strengthened by the ingress of fermentable sugars, and the resulting beer product will have an additional malt flavor.

The dialyzing action may be carried out either in a batch or continuous dialyzer (the latter using a counterflow principle).

Using my invention the brewmaster is able to produce different beers without changing his brewing procedure and he can also control the amounts of alcohol and body producing constituents in his product and also the flavor and appearance of his product.

While I have described in detail this particular combination of solutions, my invention is not intended to be confined to such combination.

As a further application of dialysis in this field I wish to include (1) dialyzing freshly-pitched wort against fermented wort, (2) fresh unpitched wort against fermenting wort, and (3) modifications of these.

Using my invention with other solutions I can increase the malt flavor of beer without increasing the amount of objectionable albumins and I will now describe a method involving dialysis for producing these results. In order to increase the malt flavor of beer it is necessary to remove a portion of the uphopped malt wort produced in the mashing process prior to boiling this wort with hops and to add this removed portion to the fermenters. However, it is not feasible to remove a portion of the unhopped malt wort as it leaves the mash tub in an untreated or undialyzed state because it contains albumins. Ordinarily these albumins are precipitated from the wort by adding hops thereto and by boiling with hops, but in the present process the unhopped malt wort has not, of course, been acted on by the hops and the albumins present in the unhopped malt wort would cause trouble later by producing opalescence in the beer. The following method includes steps for separating these albumins or large-molecule nitrogenous substances.

The first unhopped malt wort coming from the mash tub which will normally run twenty to twenty-four degrees Balling before sparging water is added, is dialyzed against pure water by means of a membrane or parchment. The sugars with their flavors and natural coloring matter and dialyzable substances will pass through the membrane from the wort side to the water side, but substantially no albumins or other large-molecule substances will pass through the membrane to the water side. After several days of dialyzing, this new solution of sugars and flavors and dialyzed matter is added to a batch of fermenting wort, thereby increasing the desirable malt flavor of the product without the addition of troublesome albumins.

That portion of the unhopped malt wort which did not pass through the membrane may be added to the hop kettle where the excess albumins can be precipitated by boiling with hops, or it can be added to the next batch in the mash tub where the albumins may be modified by further mashing. The use of a dialyzing membrane is the only method known to me for separating these two classes of substances and provides a positive way of control during the manufacture of the beer product.

Modifications of the above method are readily apparent and only a few will be enumerated:—

(1) Yeast may be added to either or both sides of the membrane.

(2) Dialyzing the heavy or sweet, unhopped, malt wort against fermented hopped wort, or against one that is in the process of fermenting.

(3) Yeast may be added to the heavy or sweet, unhopped, malt wort before dialyzing such wort against water or against other wort.

(4) The heavy or sweet, unhopped, malt wort may be fermented for several days before dialyzing such wort against water or against other wort.

The details of operation of the above modifications are believed to be obvious and need not be repeated for each case.

Another instance where dialysis may be employed to control the ratio of the fermentables to non-fermentables in the wort is to protect the proteins and dextrins in a wort (especially a wort deficient in these ingredients) from the excessive or drastic action of certain constituents of yeast, such as peptase and dextrinase, for instance. The yeast is not allowed to act on the wort in the usual way and in this way the action of the yeast on the wort is modified. A normal wort or, if desired, a heavy wort is dialyzed against pure water. Yeast may be added to the water side either before or after dialysis starts. The sugars and small-molecule nitrogenous bodies will migrate through the membrane or parchment into the water. The sugars will be attacked by the yeast and eventually be converted principally to alcohol and $CO_2$, while the nitrogenous bodies will function as yeast food. At the same time some of the smaller yeast constituents (principally those which attack the sugars and starch) will migrate from the water side through the membrane or parchment into the wort solution. But those constituents of the yeast which break down the proteins and dextrins, such as, for instance, peptase and dextrinase, will not pass through the membrane or parchment and will in the main be confined on the water side or in the water compartment.

After the desired amount of dialysis and fermentation has taken place, the two solutions on opposite sides of the dialyzing membrane or parchment may be mixed and fermentation allowed to go to completion. The duration of this final fermentation is short as compared to a regular fermentation of an undialyzed wort since the fermentation which took place during dialysis reduced the amount of fermentables appreciably. The result will be that those ingredients which produce foam stability and a full-bodied product will be exposed to the action of the yeast for a shorter time. Another way to use the above mentioned solutions after the desired amount of dialysis and initial fermentation has taken place is to add them to other wort solutions lacking in particular constituents, such as proteins and dextrins.

A slight modification of the above example is to dialyze a heavy wort against a light wort. Yeast can be added to either of these wort solutions before or after dialysis starts. After the desired amount of dialysis has taken place, the solutions can be treated as above.

From the foregoing it will be apparent that I have disclosed methods of making beer or the like and of controlling the manufacture of beer or the like to produce products having desired characteristics. My invention in its application is positive and results may be easily duplicated and in fact new products may be obtained which have never before been possible under the prior art methods. In my invention the dialyzing times, solutions and temperatures may be varied to suit the individual tastes or preferences. The dialyzing chambers must be secure against leakage or inadvertent mixing of the solutions to be dialyzed. The membranes or parchments used in dialysis as applied to the manufacture of beer according to my invention are well known and may be purchased in the open market. Another feature of my invention is cheapness of the installment of apparatus for practising my invention. It is important to note that in the dialysis as carried out by me there are migrations in both directions through the membrane or parchment. In addition my invention may be practised under pressures other than atmospheric.

My invention may also be used to recover soluble material from waste malt as produced during the manufacture of beer, for instance, by dialyzing malt against water or in other ways to recover soluble material from waste products in brewing or malting. Especially is my invention useful for recovering valuable ingredients from malt where the malt is not sparged. In this way a beer having greater body and a full taste is produced because the wort is not weakened or diluted by sparging, and by dialyzing the waste malt against water, valuable constituents are recovered which may be added to the mash tub in the next mashing operation or which may be otherwise utilized. A further application of my invention for recovering ingredients from waste materials is the removal of residual extract from the malt mash after the main body of the extract and several spargings have been withdrawn. The last few spargings in present practise do not dissolve out much extract from the malt mash, since the water from previous spargings has formed channels through the bed of mash and these channels have been exhausted of extract. The filter bed of husks cannot be disturbed since cloudiness in the extract would result. The following are illustrative and explanatory examples of the manner of removing soluble extract from the spent grains of malt. The malt mash after sparging is dialyzed against water, using as small amount of water as possible to avoid dilution. Yeast may be added to either or both sides of the dialyzing membrane in order to prevent wild yeasts or ferments and bacteria from spoiling the solutions during dialysis. Or the spent grains may be stirred with water to remove the soluble ingredients. This step may be repeated by stirring again with water to insure substantially complete removal of the ingredients. Then this solution or these solutions or suspensions are dialyzed against pure water and yeast may be added as above.

I have set forth the best forms of my invention known to me now but I am not to be restricted to these forms except as defined in the appended claims.

What I claim is:

1. A method of the character described for improving the taste of beer or the like, which comprises dialyzing a fermented wort against an unfermented wort to cause migration of malt flavored substances through a semi-permeable membrane to the fermented wort.

2. A method of the character described for improving the taste of beer or the like, which comprises dialyzing a fermented wort against an unfermented wort to cause migration of malt flavored substances through a semi-permeable membrane to the fermented wort, and fermenting the fermentable substances added to the fermented wort.

3. A method for making beer or the like, which comprises dialyzing a fermented wort against an unfermented wort to cause migration of malt flavored substances through a semi-permeable membrane to the fermented wort, and fermenting the unfermented wort to produce a beer.

4. A method for making beer or the like products which comprises dialyzing a batch of fermented wort against a batch of unfermented wort to cause migration of malt flavored substances and fermentable substances through a parchment member to the fermented wort, and then fermenting each batch separately to produce different beer products.

5. A method of making beer or the like which comprises dialyzing unhopped malt wort against water to cause migration of sugars and dialyzable material through a membrane to the water and adding such water solution to a fermenting wort and fermenting to increase the alcoholic content of the beer or the like and to increase the flavor of the beer product.

6. A method of making beer or the like which comprises placing wort on one side of a membrane and water on the other side of the membrane, permitting dialysis to take place to add sugars and dialyzable material to the water and adding such water to a fermenting wort and fermenting to increase the alcoholic content of the wort and the flavor of the beer product.

7. A step in the method of making beer or the like which comprises dialyzing wort against water to collect dialyzed substances in the water.

8. A step in the method of making beer or the like which comprises dialyzing a solution containing sugars and malt flavored substances against water to cause migration of dialyzable substances through a parchment member into the water.

9. A method of making beer or the like which comprises dialyzing unhopped malt wort against water to cause migration of dialyzable substances through a parchment member into the water and adding such water solution to a wort.

10. A method of making beer or the like which comprises dialyzing a fermenting wort against a fermented wort to increase the amount of fermentable substances in the fermented wort without increasing the amounts of objectionable haze-forming substances therein.

11. A method of making beer or the like which comprises dialyzing wort against water containing yeast and then mixing the wort and yeast-containing water.

12. A method of making beer or the like to protect the ingredients in a wort which produce foam stability and impart full body to a beer from the excessive or drastic action of certain yeast constituents, which comprises dialyzing a wort against water containing yeast to cause migration into the water of sugars and fermentable matter, and then mixing the wort and the yeast-containing water and further fermenting to make a beer product.

13. A step in the method of treating wort for protecting nitrogen bearing compounds therein, which comprises dialyzing a wort against water and adding yeast to the water to ferment the sugars and fermentable matter which have migrated from the wort.

14. A method for making beer or the like which comprises dialyzing a wort against water containing yeast to cause migrations through a membrane of fermentable and dialyzable substances from the wort to the water and of certain yeast constituents from the water to the wort.

15. A method for making beer or the like which comprises dialyzing a wort against water containing yeast to cause migrations through a membrane of fermentable and dialyzable substances from the wort to the water and of certain yeast constituents from the water to the wort and fermenting the fermentable substances in the water while permitting further dialysis and while the yeast constituents in the wort break down sugars and starch into fermentable sugars, mixing the two solutions and fermenting further.

16. A method of the character described for producing beer which comprises dialyzing a fermenting wort against an unfermented wort, permitting fermentation to go on, and then mixing the worts, and further fermenting the mixture.

17. A method of the character described for treating beer which comprises separating a fermented wort and an unfermented wort by a dialyzing membrane to permit the migration of sugars and dialyzable substances from the unfermented wort through the membrane to the fermented wort, mixing the two worts and permitting additional fermentation.

18. A method for controlling the ratio of fermentable constituents to non-fermentable constituents in a wort which comprises dialyzing wort against a solution containing fermentable substances and body-giving substances.

19. A method for producing different products from the same type of wort which comprises fermenting one batch of wort, dialyzing the fermented wort against a batch of unfermented wort to increase the amount of fermentable substances in the fermented wort, and then fermenting each batch separately.

20. In the manufacture of beer or the like a method of the character described which comprises dialyzing one solution against another solution to cause migration of desirable constituents from one solution to the other.

21. A method of producing beer or the like which comprises dialyzing a fermenting wort against an unfermented wort to increase the amount of fermentable substances in the fermenting wort without increasing the amounts of objectionable haze-forming substances therein.

22. A method of producing beer or the like which comprises dialyzing an unfermented unhopped malt wort against fermented wort to increase the amount of fermentable substances in the fermented wort without increasing the amounts of objectionable haze-forming substances therein.

23. A method of the character described for producing different beers which comprises dialyzing a fermenting heavy gravity wort against a fermenting light gravity wort.

24. A method of the character described for making beer or the like wherein the ratio of the fermentable to non-fermentable substances in a wort may be controlled and the malt flavor of the wort increased, which includes dialyzing a fermented wort against an unfermented wort to cause migration of dialyzable constituents including glucose, maltose, sucrose and small sized nitrogenous bodies through a parchment membrane from the unfermented wort to the fermented wort while substantially preventing the migration of haze-forming substances from the unfermented wort to the fermented wort, and fermenting the unfermented wort.

25. A method of making beer or the like which comprises placing wort on one side of a parchment membrane and water containing yeast on the other side of the parchment membrane, the membrane being selected to permit migration of diffusible substances including fructose, maltose, sucrose and small sized nitrogenous bodies from the wort to the water and to permit migration of diffusible yeast constituents including invertase and maltase from the yeast-containing water to the wort so that the migrated invertase and maltase will attack the sucrose and maltose in the wort, the parchment membrane substantially preventing the migration from the yeast-containing water to the wort of yeast constituents which break down proteins and dextrins, including peptase and dextrinase, and permitting dialysis to take place for the desired length of time.

26. In the manufacture of beer or the like the step which comprises dialyzing fermented wort liquid against another liquid to cause migration of desirable constituents from one liquid to the other liquid.

JOHN F. SILHAVY.